US012597445B2

(12) United States Patent
Rakshit et al.

(10) Patent No.: US 12,597,445 B2
(45) Date of Patent: Apr. 7, 2026

(54) COLLABORATIVE ENHANCEMENT OF VOLUMETRIC VIDEO WITH A DEVICE HAVING MULTIPLE CAMERAS

(71) Applicant: INTERNATIONAL BUSINESS MACHINES CORPORATION, Armonk, NY (US)

(72) Inventors: Sarbajit K. Rakshit, Kolkata (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 18/054,690

(22) Filed: Nov. 11, 2022

(65) Prior Publication Data

US 2024/0161784 A1 May 16, 2024

(51) Int. Cl.
| | |
|---|---|
| *G11B 27/036* | (2006.01) |
| *G06F 3/14* | (2006.01) |
| *H04N 13/167* | (2018.01) |
| *H04N 13/172* | (2018.01) |
| *H04N 13/189* | (2018.01) |
| *H04N 13/302* | (2018.01) |

(52) U.S. Cl.
CPC .......... *G11B 27/036* (2013.01); *G06F 3/1454* (2013.01); *H04N 13/167* (2018.05); *H04N 13/172* (2018.05); *H04N 13/189* (2018.05); *H04N 13/302* (2018.05)

(58) Field of Classification Search
CPC .. G11B 27/036; H04N 13/172; H04N 13/189; H04N 13/167; H04N 13/302; G06F 3/1454
See application file for complete search history.

(56) References Cited

U.S. PATENT DOCUMENTS

| | | |
|---|---|---|
| 10,964,104 B2 | 3/2021 | Duffy |
| 11,321,919 B2 | 5/2022 | Horsman |

(Continued)

OTHER PUBLICATIONS

"Arcturus Adds Depthkit Support to HoloSuite, Streamlining the Volumetric Video Pipeline", Acturus, Nov. 9, 2021, 4 pp., [online][retrieved Aug. 17, 2022] https://www.globenewswire.com/en/news-release/2021/11/09/2330730/0/en/Arcturus-Adds-Depthkit-Support-to-HoloSuite-Streamlining-the-Volumetric-Video-Pipeline.html.

(Continued)

*Primary Examiner* — Girumsew Wendmagegn
(74) *Attorney, Agent, or Firm* — James L. Olsen

(57) ABSTRACT

Provided are techniques for collaborative enhancement of volumetric video with a device having multiple cameras. A volumetric video is displayed as a holographic projection. In response to identifying one or more user actions of a user at the device with the holographic projection of the volumetric video, the volumetric video is updated and an updated holographic projection that indicates the one or more user actions of the user is displayed. Additional content is received for the updated volumetric video from a plurality of other devices, where the additional content comprises one or more user actions of other users at the plurality of other devices. The additional content is aggregated to generate an aggregated volumetric video that indicates the one or more user actions of the user and the one or more user actions of the other users. A further updated holographic projection based on the aggregated volumetric video is displayed.

20 Claims, 11 Drawing Sheets

(56) References Cited

U.S. PATENT DOCUMENTS

| | | | |
|---|---|---|---|
| 2020/0169717 | A1* | 5/2020 | Zavesky ............... G06V 10/751 |
| 2021/0227178 | A1* | 7/2021 | Lyon ...................... G06T 19/003 |
| 2021/0368155 | A1 | 11/2021 | Begeja |

OTHER PUBLICATIONS

"HoloPlayer One Turn your 3D data into an interactive hologram", Geo Week News, Dec. 6, 2017, 6 pp.. [online] [retrieved Aug. 17, 2022] https://www.geoweeknews.com/news/holoplayer-one-simple-platform-turns-3d-data-interactive-hologram.

J. Zhang, et al., "NeuVV: Neural Volumetric Videos with Immersive Rendering and Editing", arXiv:2202.06.088v1 [cs.CV] Feb. 12, 2022, 18 pp. (available at: https://deepai.org/publication/neuvv-neural-volumetric-videos-with-immersive-rendering-and-editing).

"New Integration Create holograms using 4Dviews high quality volumetric video capture system and stream them in 8th Wall WebAR", 8thWall, Mar. 1, 2022, 6 pp., [online][retrieved Aug. 17, 2022] https://www.8thwall.com/blog/post/67359097961/new-integration-create-holograms-using-4dviews-high-quality-volumetric-video-capture-system-a . . . .

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

"Canon and IBM Japan Form Joint Business Operation Utilizing Volumetric Video Technology to Promote the Visual and Performing Arts", Canon, Jul. 7, 2021, 8 pp. (retrieved from: https://sg.canon/en/consumer/form-joint-utilizing-volumetric-video-technology/news).

J. Antunes, "Canon and IBM: using volumetric video to promote visual arts", Jul. 13, 2021, 2 pp. (retrieved from: https://www.provideocoalition.com/canon-and-IBM-using-volumetric-video-to-promote-visual-arts/).

A. Cohen, "Welcome to the Netaverse, Brooklyn Nets Players Are Seen in a New (3D) Light", sporttechie.com, Feb. 2, 2022, 6 pp. (retrieved from: https://www.sporttechie.com/welcome-to-the-netaverse-where-brooklyn-nets-players-can-be-seen-in-a-whole-new-3d-light).

"Canon, Inc. and IBM Launch Collaboration in Entertainment and the Arts in Japan", Jul. 15, 2021, 4 pp. (retrieved from: https://newsroom.ibm.com/2021-07-15-Canon,-Inc-and-IBM-Launch-Collaboration-in-Entertainment-and-the-Arts-in-Japan).

"Introduction of Foldable Screens", geeksforgeeks.org, Jun. 3, 2020, updated Sep. 30, 2022, 4 pp. (retrieved from: https://www.geeksforgeeks.org/introduction-of-foldable-screens/).

"The business benefits of volumetric video", Business.bt.com, Jun. 17, 2021, 5 pp. (retrieved from: https://business.bt.com/why-choose-bt/insights/the-future-is-now/transforming-industries-with-volumetric-video).

* cited by examiner

700

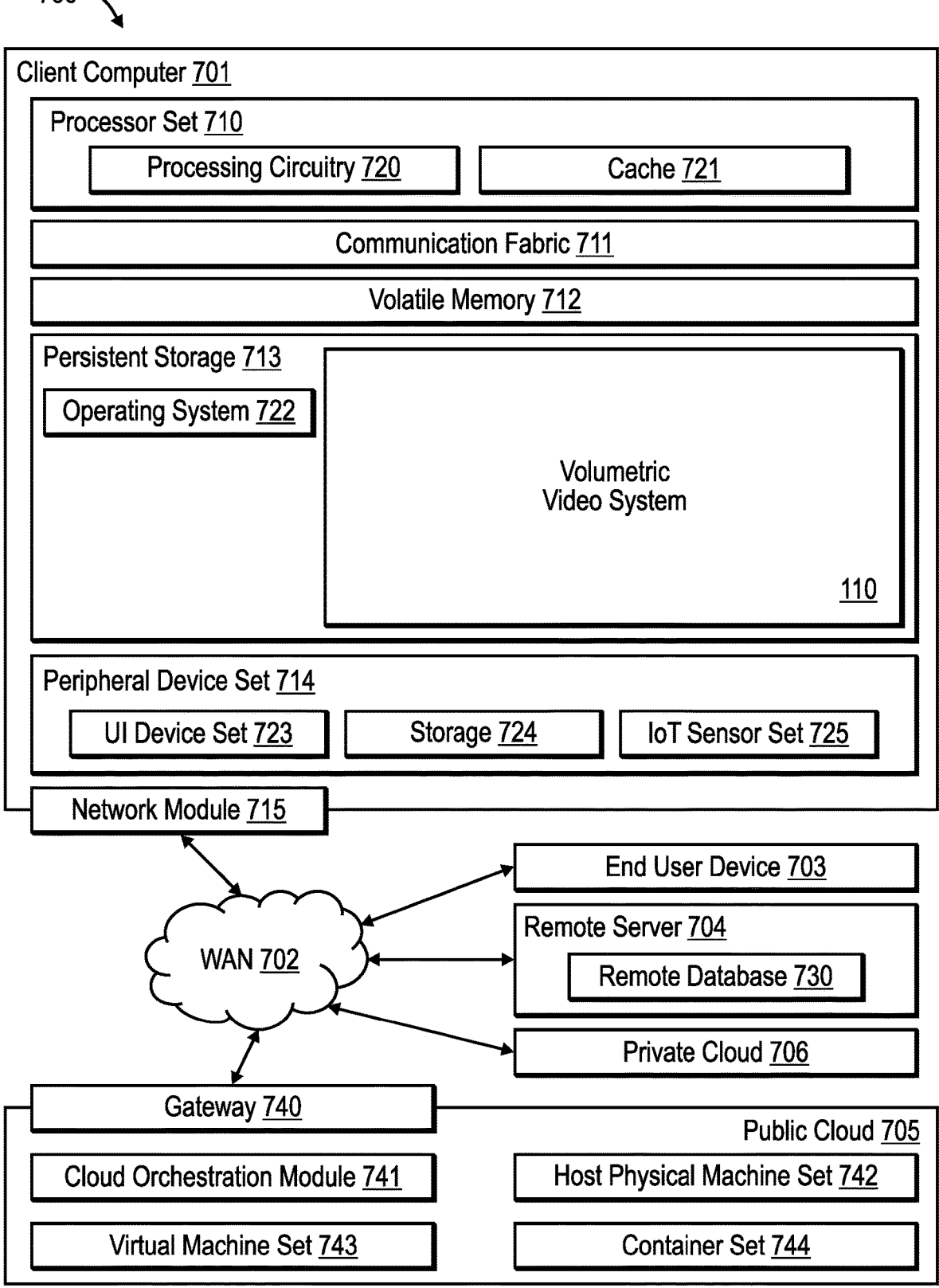

Client Computer 701

Processor Set 710

Processing Circuitry 720          Cache 721

Communication Fabric 711

Volatile Memory 712

Persistent Storage 713

Operating System 722

Volumetric
Video System

110

Peripheral Device Set 714

UI Device Set 723          Storage 724          IoT Sensor Set 725

Network Module 715

WAN 702

End User Device 703

Remote Server 704

Remote Database 730

Private Cloud 706

Gateway 740

Public Cloud 705

Cloud Orchestration Module 741          Host Physical Machine Set 742

Virtual Machine Set 743          Container Set 744

FIG. 7

COLLABORATIVE ENHANCEMENT OF VOLUMETRIC VIDEO WITH A DEVICE HAVING MULTIPLE CAMERAS

BACKGROUND

Embodiments of the invention relate to collaborative enhancement of volumetric video with a device having multiple cameras.

Volumetric video technology leverages cameras and advanced data processing to render three dimensional (3D) images from a virtual space. This allows for video point of views to be generated from any angle within that space to create a more immersive experience for viewers. For example, volumetric video technology has been used during an international rugby tournament, as well as in other sports events.

From healthcare to retail, volumetric video is transforming entire industries. For businesses, small and large, volumetric video opens up new ways of collaborating and enabling virtual offices to be created. Volumetric video is being used in the entertainment sector, for content delivery devices, in retail and e-commerce sectors, etc.

SUMMARY

In accordance with certain embodiments, a computer-implemented method is provided for collaborative enhancement of volumetric video with a device having multiple cameras. The computer-implemented method comprises operations. In such embodiments, a volumetric video is displayed as a holographic projection. In response to identifying one or more user actions of a user at the device with the holographic projection of the volumetric video, the volumetric video is updated and an updated holographic projection of the updated volumetric video that indicates the one or more user actions of the user is displayed. Additional content is received for the updated volumetric video from a plurality of other devices, where the additional content comprises one or more user actions of other users at the plurality of other devices. The additional content from the plurality of other devices is aggregated with the updated volumetric video to generate an aggregated volumetric video that indicates the one or more user actions of the user and the one or more user actions of the other users. A further updated holographic projection based on the aggregated volumetric video is displayed.

In accordance with other embodiments, a computer program product is provided for collaborative enhancement of volumetric video with a device having multiple cameras. The computer program product comprises a computer readable storage medium having program code embodied therewith, the program code executable by at least one processor to perform operations. In such embodiments, a volumetric video is displayed as a holographic projection. In response to identifying one or more user actions of a user at the device with the holographic projection of the volumetric video, the volumetric video is updated and an updated holographic projection of the updated volumetric video that indicates the one or more user actions of the user is displayed. Additional content is received for the updated volumetric video from a plurality of other devices, where the additional content comprises one or more user actions of other users at the plurality of other devices. The additional content from the plurality of other devices is aggregated with the updated volumetric video to generate an aggregated volumetric video that indicates the one or more user actions of the user and the one or more user actions of the other users. A further updated holographic projection based on the aggregated volumetric video is displayed.

In accordance with yet other embodiments, a computer system is provided for collaborative enhancement of volumetric video with a device having multiple cameras. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In such embodiments, a volumetric video is displayed as a holographic projection. In response to identifying one or more user actions of a user at the device with the holographic projection of the volumetric video, the volumetric video is updated and an updated holographic projection of the updated volumetric video that indicates the one or more user actions of the user is displayed. Additional content is received for the updated volumetric video from a plurality of other devices, where the additional content comprises one or more user actions of other users at the plurality of other devices. The additional content from the plurality of other devices is aggregated with the updated volumetric video to generate an aggregated volumetric video that indicates the one or more user actions of the user and the one or more user actions of the other users. A further updated holographic projection based on the aggregated volumetric video is displayed.

BRIEF DESCRIPTION OF THE SEVERAL VIEWS OF THE DRAWINGS

Referring now to the drawings in which like reference numbers represent corresponding parts throughout:

FIG. 7 illustrates a computing environment in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
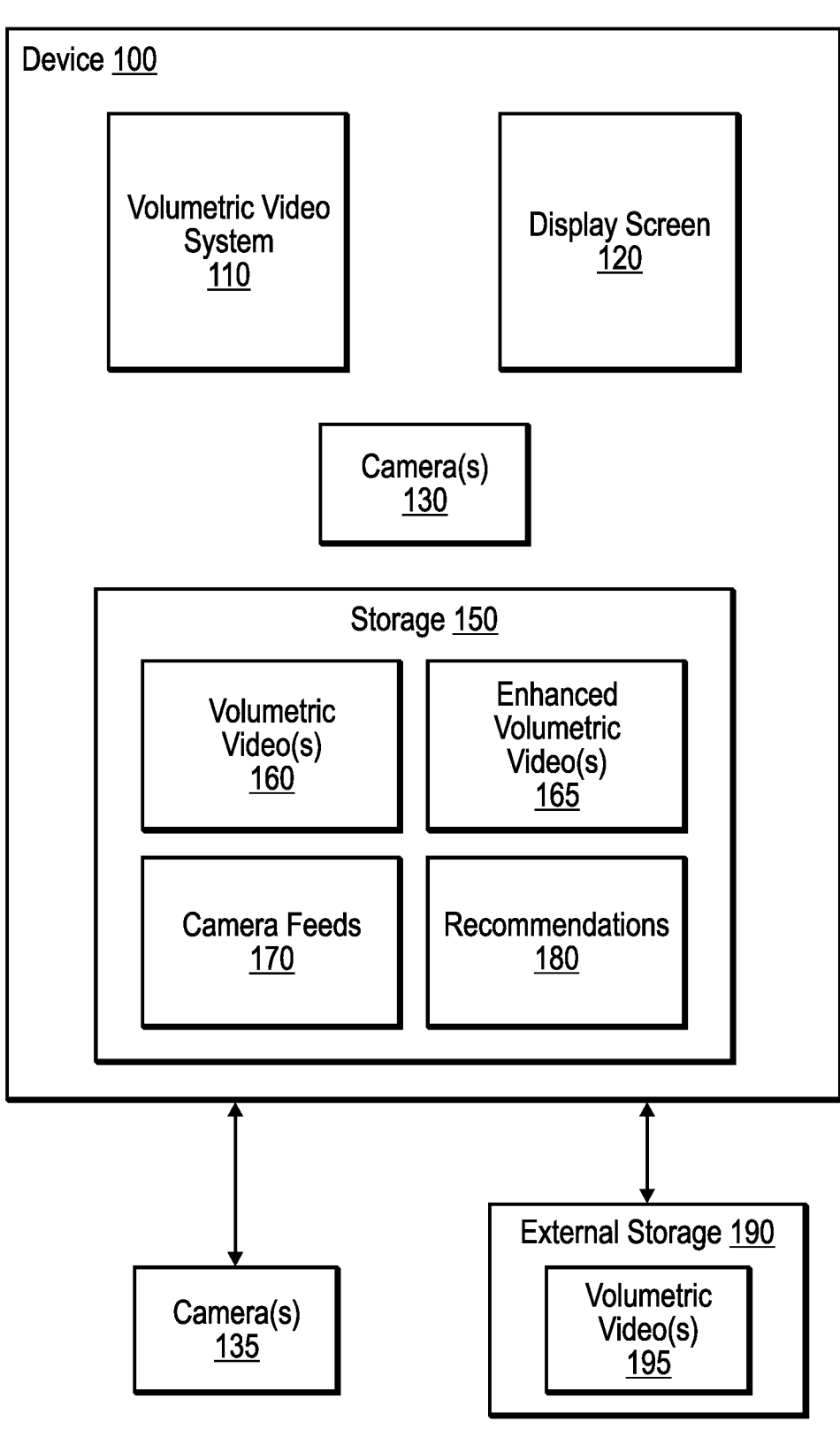
FIG. 1 illustrates, in a block diagram, a computing environment in accordance with certain embodiments.

FIG. 1 illustrates, in a block diagram, a computing environment in accordance with certain embodiments. A device 100 in FIG. 1 may be referred to as a computing device or a computer. The device 100 includes a volumetric video system 110 and has a display screen 120. The device 100 also includes one or more cameras 130 and storage 150. The storage 150 includes one or more volumetric videos 160, one or more enhanced volumetric videos 165, camera feeds 170, and recommendations 180 (on how to fold the display screen 120). The device 100 may be connected to one or more cameras 135 (which are external to the device 100). The device 100 is also connected to external storage 190, which stores one or more volumetric videos 195.

In certain embodiments, at least some of the cameras 130 are on the front of the display screen 120. In certain embodiments, the cameras 135 are in the vicinity of the device 100 (e.g., cameras installed in a room, cameras installed in a public area, etc.). In certain embodiments, the cameras 135 are part of Internet of Things (IoT) devices. The multiple cameras 130, 135 are multi-directional as they capture images and video of user actions from different directions. The user actions may be described as user interactions with a holographic projection of a volumetric video 160 or an enhanced volumetric video 165.

In certain embodiments, the device 100 is a folding device, such as a laptop computer, a smartphone that folds, etc. The display screen 120 may be adjusted to a particular angle. The display screen 120 may be described as a "foldable" screen that is "folded", which may be described as being positioned at the particular angle.

With embodiments, the volumetric video 160 may be enhanced with user actions and or text to create an enhanced volumetric video 165. The camera feeds 170 include images and video from the one or more cameras 130, 190.

With embodiments, the volumetric video system 110 processes the camera feeds 130, 190 from multiple cameras and from various directions to create a volume of video. That is, while creating volumetric video, computing processors of the device 110 may be processing multiple camera feeds 170 from different directions.

Once the volumetric video system 110 creates the volumetric video 160 or the enhanced volumetric video 165, the volumetric video system 110 may send (to share) the volumetric video 160 or the enhanced volumetric video 165 with via different communication channels, including social networking applications. The sending device, sending user or sending volumetric video system 110 may be referred to as the sending party. The receiving device, receiving user or receiving volumetric video system 110 may be referred to as the receiving party.

Then, after the volumetric video 160 or the enhanced volumetric video 165 is shared, the user who received the volumetric video 160 or the enhanced volumetric video 165 ("receiving party") may create additional content for the volumetric video 160 or the enhanced volumetric video 165 and may update the volumetric video 160 or the enhanced volumetric video 165 with the created additional content. This may be referred to as an incremental update to the volumetric video 160 or the enhanced volumetric video 165. With embodiments, the additional content may be another volumetric video, text input and/or voice input. For example, many users may collaboratively create educational content or training material by sharing the volumetric video 160 and each enhanced volumetric video 165, with each of the users adding, incrementally, to the volumetric video 160 or the enhanced volumetric video 165.

With embodiments, after receiving the volumetric video 160 or the enhanced volumetric video 165 via any communication channel, the receiving party may perform user actions (e.g., hand movement-based actions, instrument-based actions in which case the user is moving the instrument, etc.) on the volumetric video 160 or the enhanced volumetric video 165. The cameras 130, 190 track the user actions on the volumetric video, and the volumetric video system 110 receives camera feeds 170 from the cameras 130, 190 and updates the volumetric video with additional content.

With embodiments, the volumetric video system 110 projects the volumetric video as a holographic projection (i.e., a 3D hologram). Then, the volumetric video system 110 receives input from the cameras 130 installed in different portions of the display screen 120 and/or from the cameras 135. The cameras 130, 190 track and record user actions on the holographic projection of the volumetric video to generate images and/or video of actions performed by the user. The volumetric video system 110 updates the volumetric video that is being projected with additional content based on the user actions.

Similarly, the enhanced volumetric video 165 may be projected as a holographic projection (i.e., a 3D hologram). Then, the volumetric video system 110 receives input from the cameras 130 installed in different portions of the display screen 120 and/or from the cameras 135. The cameras 130, 190 track and record user actions on the holographic projection of the enhanced volumetric video 165 to generate images and/or video of actions performed by the user. The volumetric video system 110 updates the enhanced volumetric video 165 that is being projected with additional content based on the user actions.

With embodiments, when the receiving party receives the volumetric video 160 or the enhanced volumetric video 165 from a sending party, the volumetric video system 110 provides one or more recommendations to the receiving party on how to adjust the display screen 120 (e.g., how to fold the display screen 120) so that multiple cameras 130 of the display screen 120 capture the user actions from various directions. The volumetric video system 110 updates the volumetric video 160 or the enhanced volumetric video 165 with the user actions.

With embodiments, the volumetric video system 110 updates the volumetric video 160 or the enhanced volumetric video 165 in a collaborative manner. In such embodiments, multiple receiving parties receive the volumetric video 160 or the enhanced volumetric video 165. Each of the multiple receiving parties may update the volumetric video 160 or the enhanced volumetric video 165 in a collaborative manner and view each other's actions added to the volumetric video (i.e., added to the holographic projection of the volumetric video). In particular, the cameras 130 of the display screens 120 of each receiving party capture the user actions on the volumetric video 160 or the enhanced volumetric video 165, and the volumetric video system 110 performs image analysis from the camera feeds 170 to identify what user actions have been performed. Then, the volumetric video system 110 of a first computing device creates volumetric video of the user actions and sends each other computing device the volumetric video of the user actions at the first computing device. Likewise, the volumetric video system 110 of the first computing device receives volumetric video of user actions at other computing devices, aggregates the received volumetric videos, and enhances the volumetric video 160 or the enhanced volumetric video 165 displayed at the first computing device with the user actions from the other computing devices to form an aggregated volumetric video.

With embodiments, the volumetric video system 110 may also receive text input and/or voice input via the communication channel. The volumetric video system 110 updates the volumetric video 160 or the enhanced volumetric video 165 with the text input and/or voice input. This may occur with one user or may occur in a collaborative manner with many users.

Figure 2:
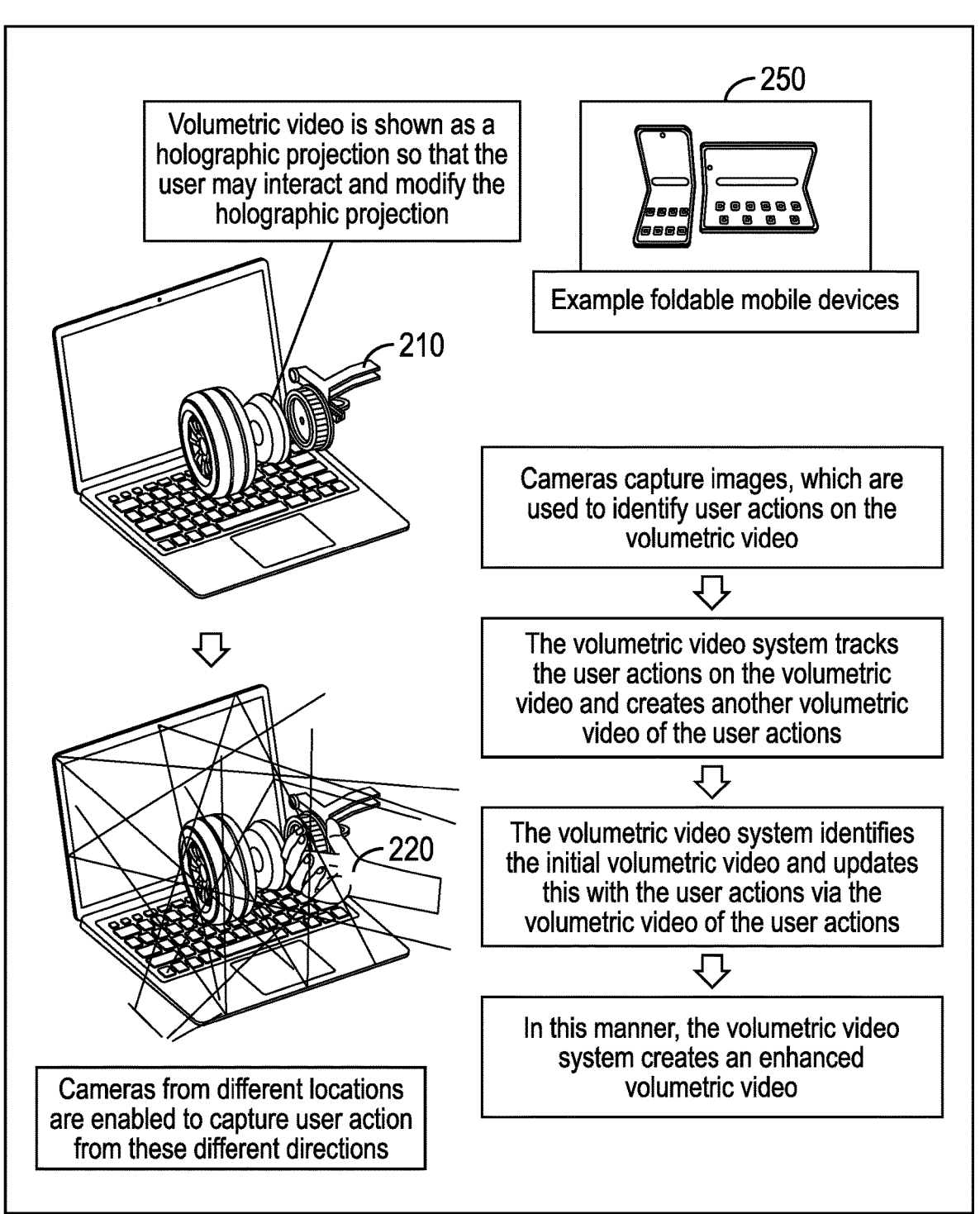
FIG. 2 illustrates an example of enhancing volumetric video in accordance with certain embodiments.

FIG. 2 illustrates an example of enhancing volumetric video in accordance with certain embodiments. In FIG. 2, a user has received a volumetric video, and the volumetric video is shown as a holographic projection 210 on a laptop so that the user may interact and modify the holographic projection 210. The volumetric video system 110 provides a recommendation on how to adjust the laptop to improve camera angles and better capture user actions. In this example, the user has adjusted the laptop in accordance with the recommendation to enable the cameras from different locations to capture the user actions from different directions.

In this example, the user uses a hand to add user action to the volumetric video via the holographic projection 220. Initially, cameras capture images, which are used to identify user action on the volumetric video. The volumetric video system 110 uses the captured images to track the user actions on the volumetric video and creates another volumetric video of the user actions. The volumetric video system 110 identifies the initial volumetric video and updates this with the user actions via the volumetric video of the user actions. That is, with embodiments, the volumetric video system 110 merges the initial volumetric video with the other volumetric video of the user actions. In this manner, the volumetric video system 110 creates an enhanced volumetric video.

FIG. 2 also illustrates examples of foldable mobile devices 250, which include a smartphone and a laptop computer.

Figure 3A:
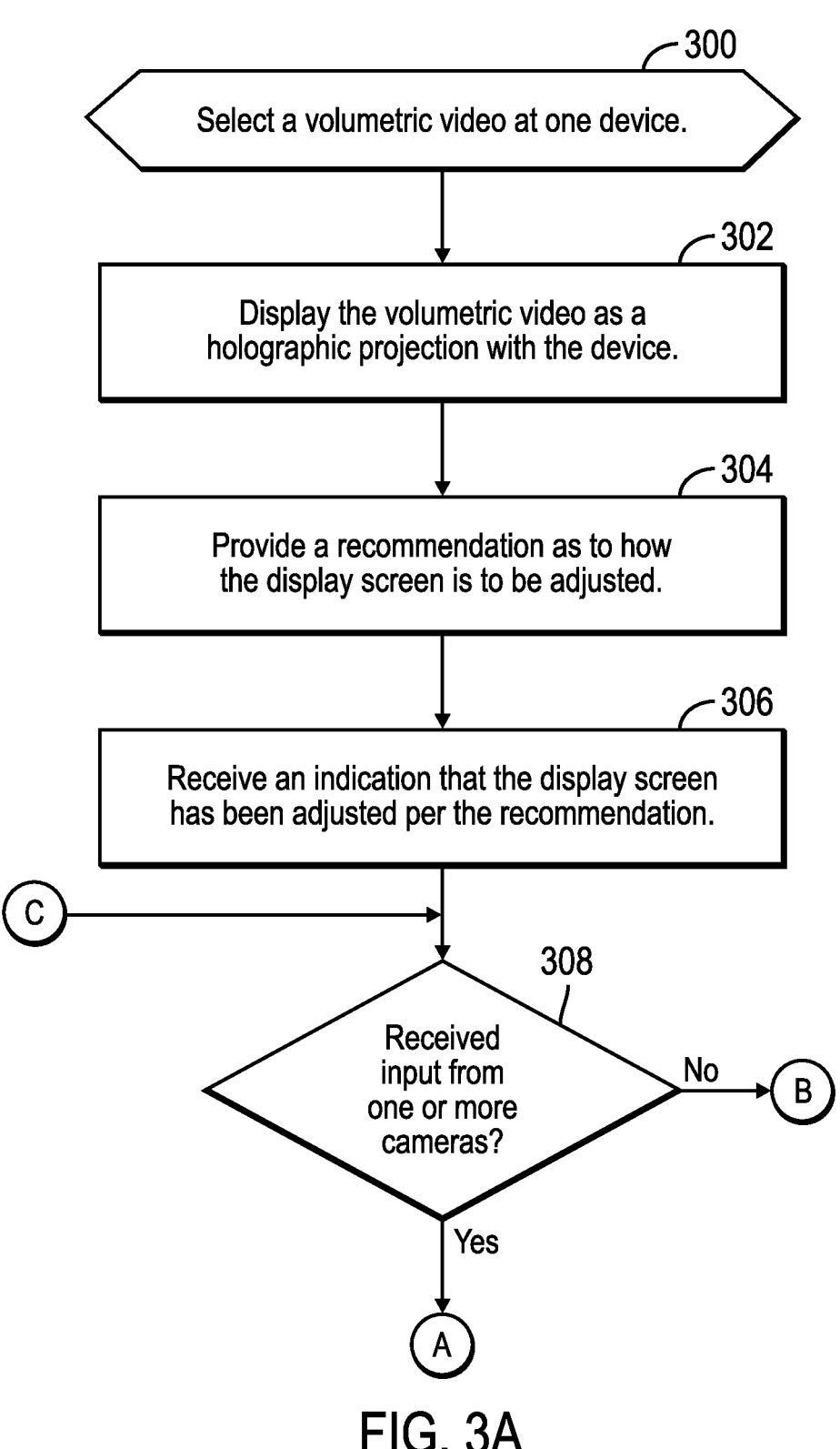
FIGS. 3A, 3B, and 3C illustrate, in a flowchart, operations for enhancing volumetric video at one device in accordance with certain embodiments.
Figure 3B:
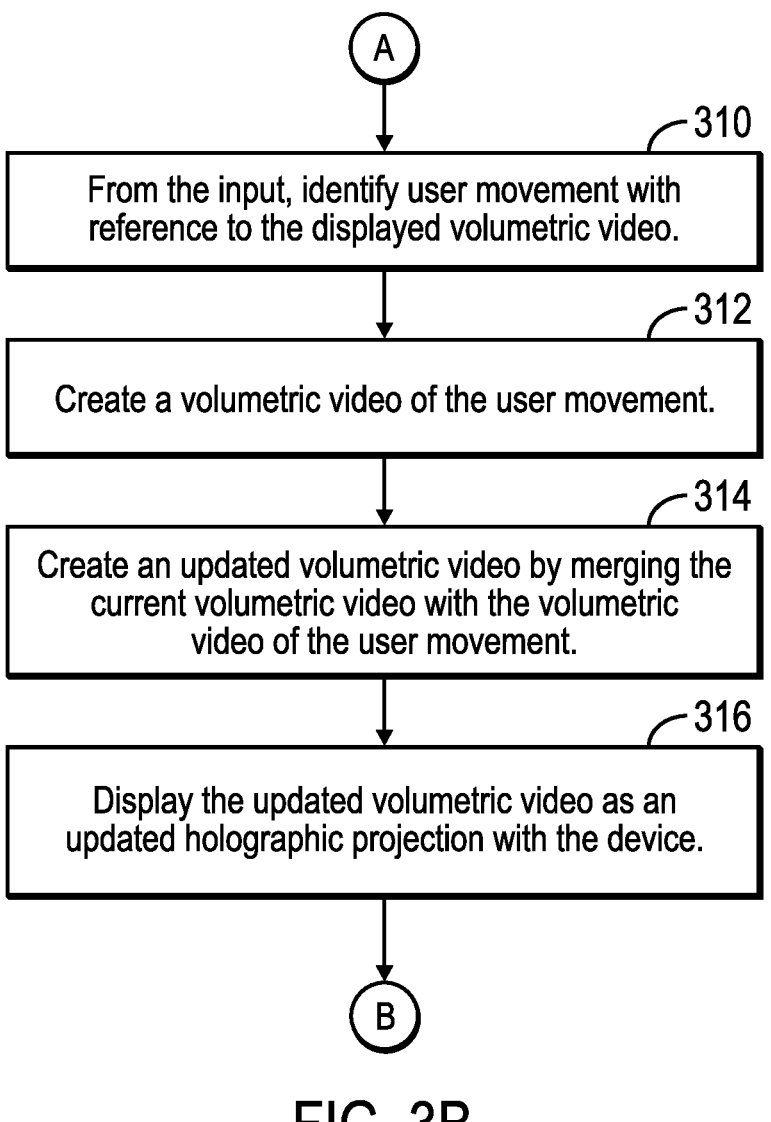
Figure 3C:
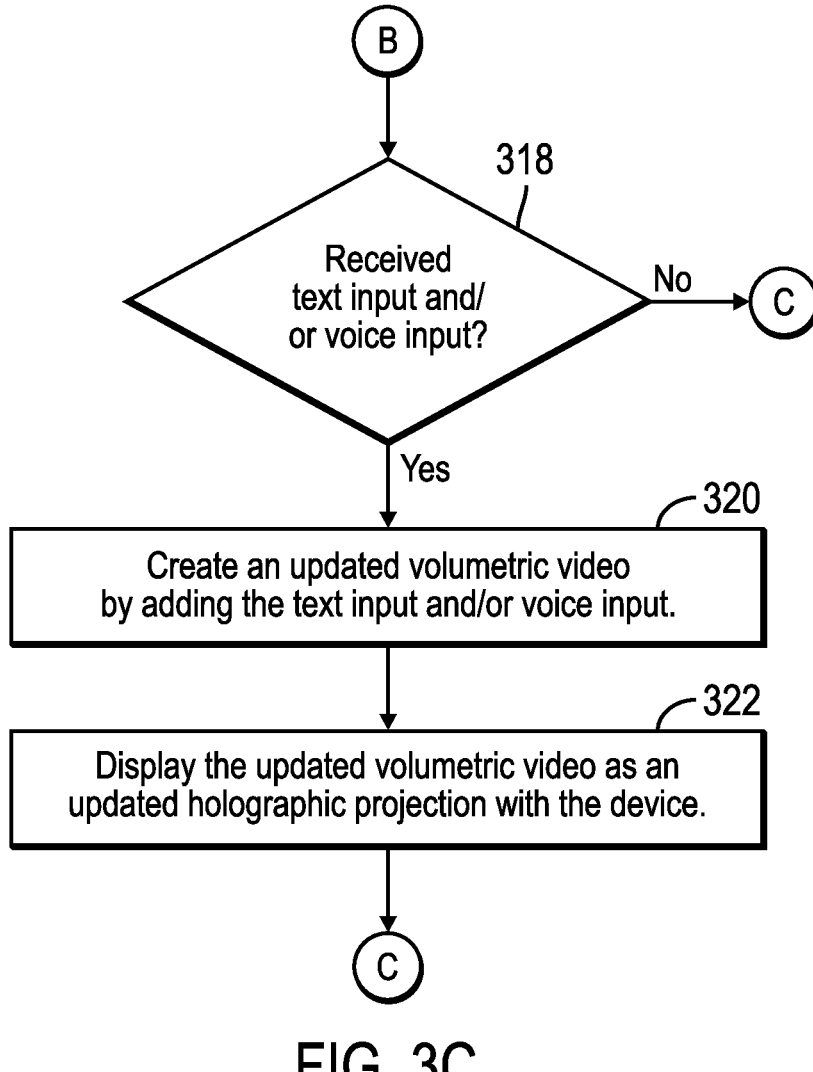

FIGS. 3A, 3B, and 3C illustrate, in a flowchart, operations for enhancing volumetric video at one computing device in accordance with certain embodiments. In FIG. 3A, control begins at block 300 with the volumetric video system 110 selecting a volumetric video. This may be referred to as a "first", "initial", "original" or "starting" volumetric video. Selecting the volumetric video may be in response to user input. With embodiments, selecting the volumetric video may include enabling the user to create the volumetric video, store the created volumetric video, and then retrieve the volumetric video for enhancement. Alternatively, with other embodiments, selecting the volumetric video may include retrieving a volumetric video from storage 150 or from external storage 190 that was created at a different device and made available to this device.

In block 302, the volumetric video system 110 displays the volumetric video as a holographic projection with the device. With various embodiments, once the volumetric video is selected, then the volumetric video system 110 may display the volumetric video on the 2D display as holographic projection or as a 3D object.

In block 304, the volumetric video system 110 provides a recommendation as to how the display screen is to be adjusted (i.e., angled or folded). In block 306, the volumetric video system 110 receives an indication that the display screen has been adjusted per the recommendation. In certain embodiments, the recommendation provides the folding angle so that the cameras may be focused from various directions and provide a better display of the holographic projection and any additional content. In certain embodiments, when the folding angle is created, cameras from various directions are enabled.

In block 308, the volumetric video system 110 determines whether input was received from one or more cameras. If so, processing continues to block 310 (FIG. 3B), otherwise, processing continues to block 316 (FIG. 3B).

In block 310, from the input from the one or more cameras, the volumetric video system 110 identifies user movement with reference to the displayed volumetric video. In block 312, the volumetric video system 110 creates a volumetric video of the user movement. In block 314, the volumetric video system 110 creates an updated volumetric video by merging the current volumetric video with the volumetric video of the user movement. The current volumetric video is the one currently being worked on.

In block 316, the volumetric video system 110 displays the updated volumetric video as an updated holographic projection with the device. The updated holographic projection includes the user movement. In certain embodiments, by merging the displayed volumetric video with the volumetric video of the user movement, the volumetric video system 110 creates an enhanced volumetric video, which the volumetric video system 110 may store in storage 150 and/or external storage 190. Optionally, for a collaboration, the volumetric video system 110 sends the enhanced volumetric video to one or more other devices. From block 316 (FIG. 3B), processing continues to block 318 (FIG. 3C).

In block 318, the volumetric video system 110 determines whether text input and/or voice input was received. If so, processing continues to block 320, otherwise, processing continues to block 308. For example, text input may be typed in or translated from voice input. Also, the voice input may be obtained from a conversation.

In block 320, the volumetric video system 110 creates an updated volumetric video by adding (e.g., incorporating) the text input and/or voice input. In block 322, the volumetric video system 110 displays the updated volumetric video as an updated holographic projection with the device. In this manner, the volumetric video system 110 updates the displayed holographic projection of the volumetric video with the text input and/or voice input. In certain embodiments, the text input is displayed in the holographic projection. In other embodiments, the text input is displayed adjacent to the holographic projection. In certain embodiments, the voice input is incorporated into the holographic projection and automatically played. In other embodiments, the voice input is available to be played adjacent to the holographic projection. This creates an enhanced volumetric video, which the volumetric video system 110 may store in storage 150 and/or external storage 190. Optionally, for a collaboration, the volumetric video system 110 sends the enhanced volumetric video to one or more other devices.

With embodiments, the processing of FIGS. 3A and 3B ends in response to user input (e.g., with the user indicating that the user is done viewing and interacting with the volumetric video, with the volumetric video being closed, with the device playing the volumetric video being shut down, etc.).

Figure 4:
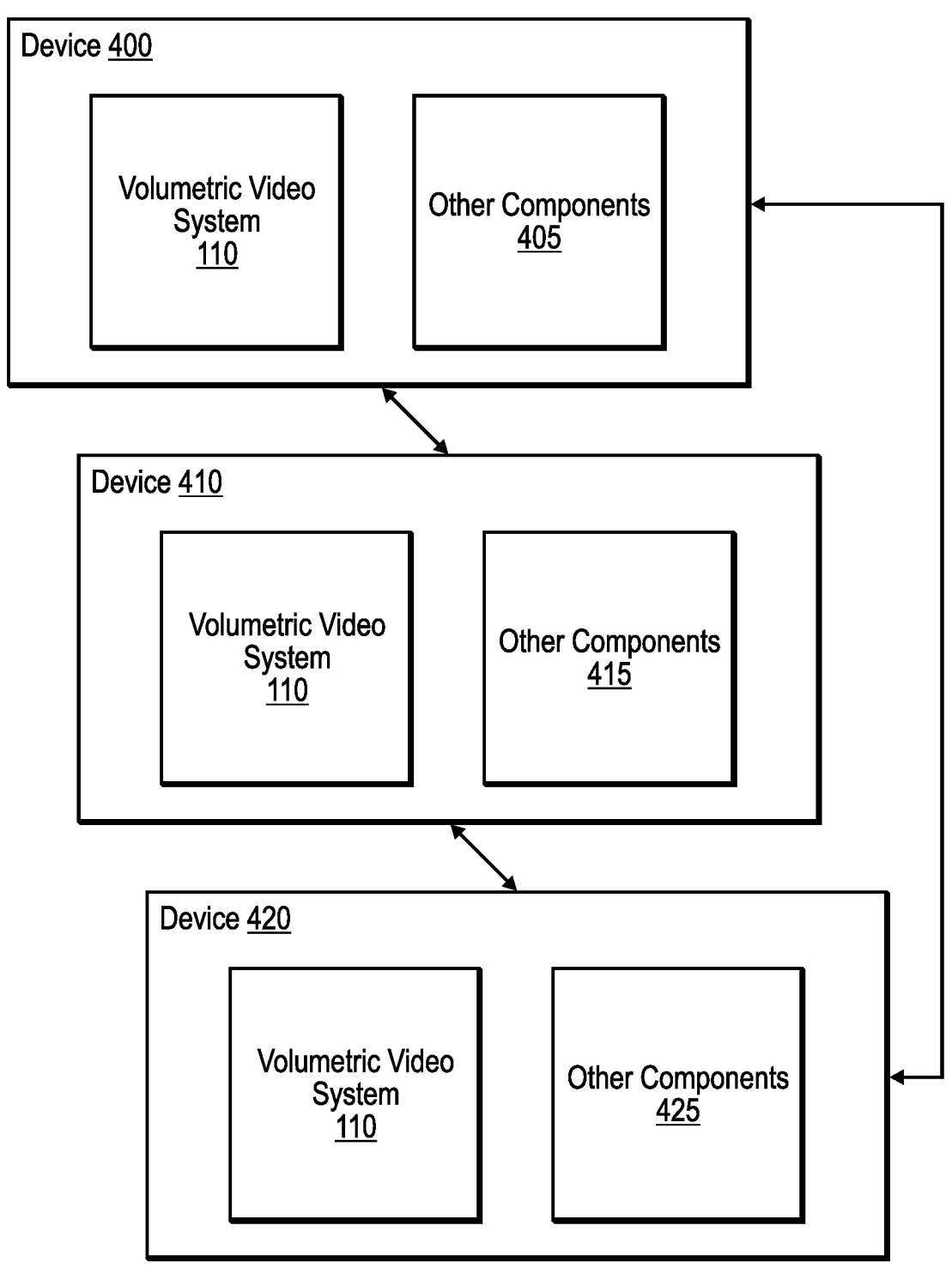
FIG. 4 illustrates a collaboration computing environment in accordance with certain embodiments.

FIG. 4 illustrates a collaboration computing environment in accordance with certain embodiments. In FIG. 4, devices 400, 410, and 420 are connected to each other and are able to communicate with each other. Although three devices 400, 410, 420 are illustrated, collaboration may occur with two or more devices. Each of the devices 400, 410, 420 includes the volumetric video system 110. In addition, each device 400, 410, 420 includes, respectively, other components 405, 415, 425. In certain embodiments, the other components 405, 415, and 425 include the components (other than the volumetric video system 110) shown for device 100 in FIG. 1. Also, with embodiments, the devices 400, 410, and 420 may be coupled to separate or shared external storage which may store the volumetric videos and enhanced volumetric videos.

Figure 5A:
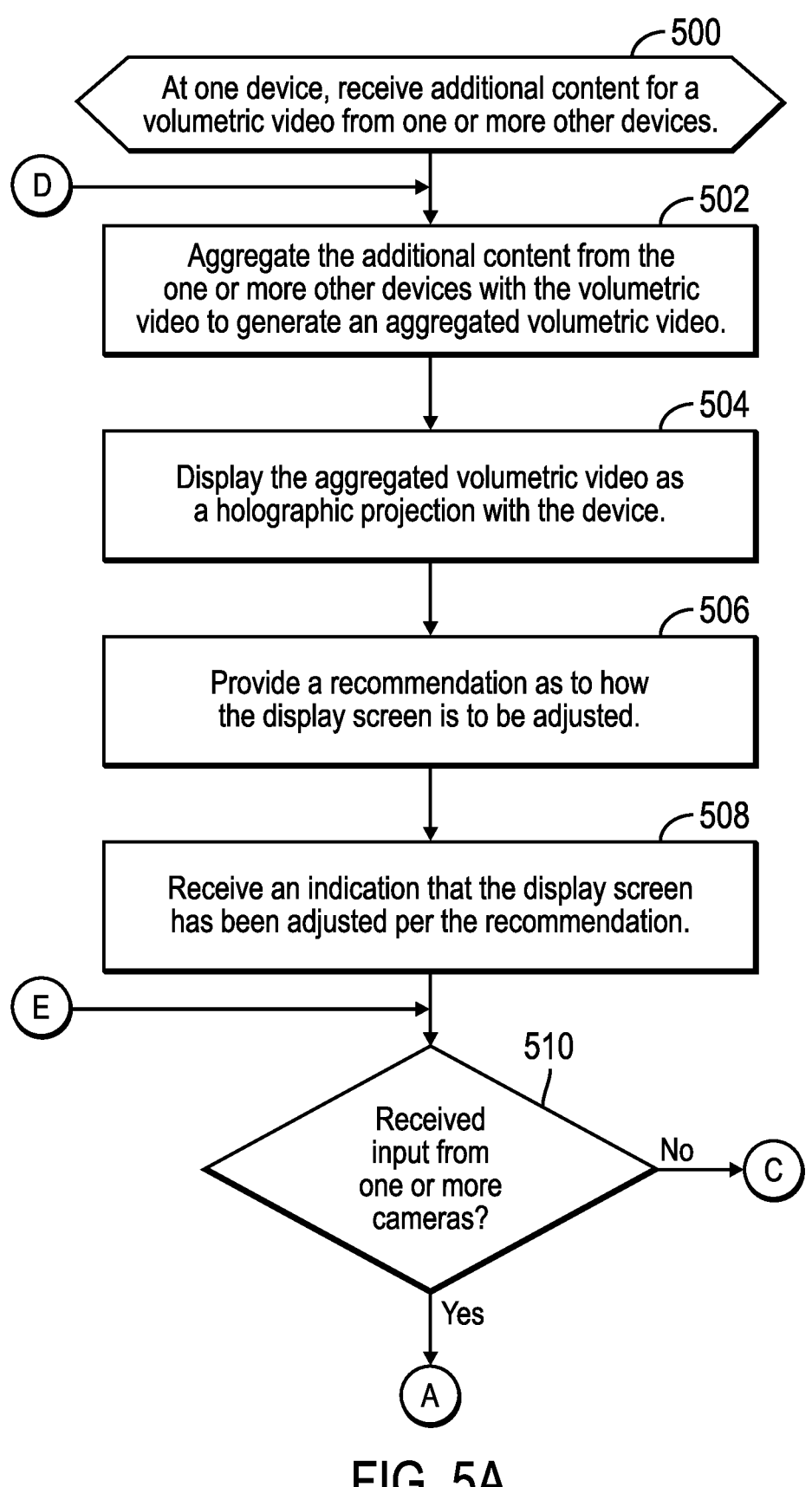
FIGS. 5A, 5B, and 5C illustrate, in a flowchart, operations for enhancing volumetric video at one device that is in collaboration with one or more other devices in accordance with certain embodiments.
Figure 5B:
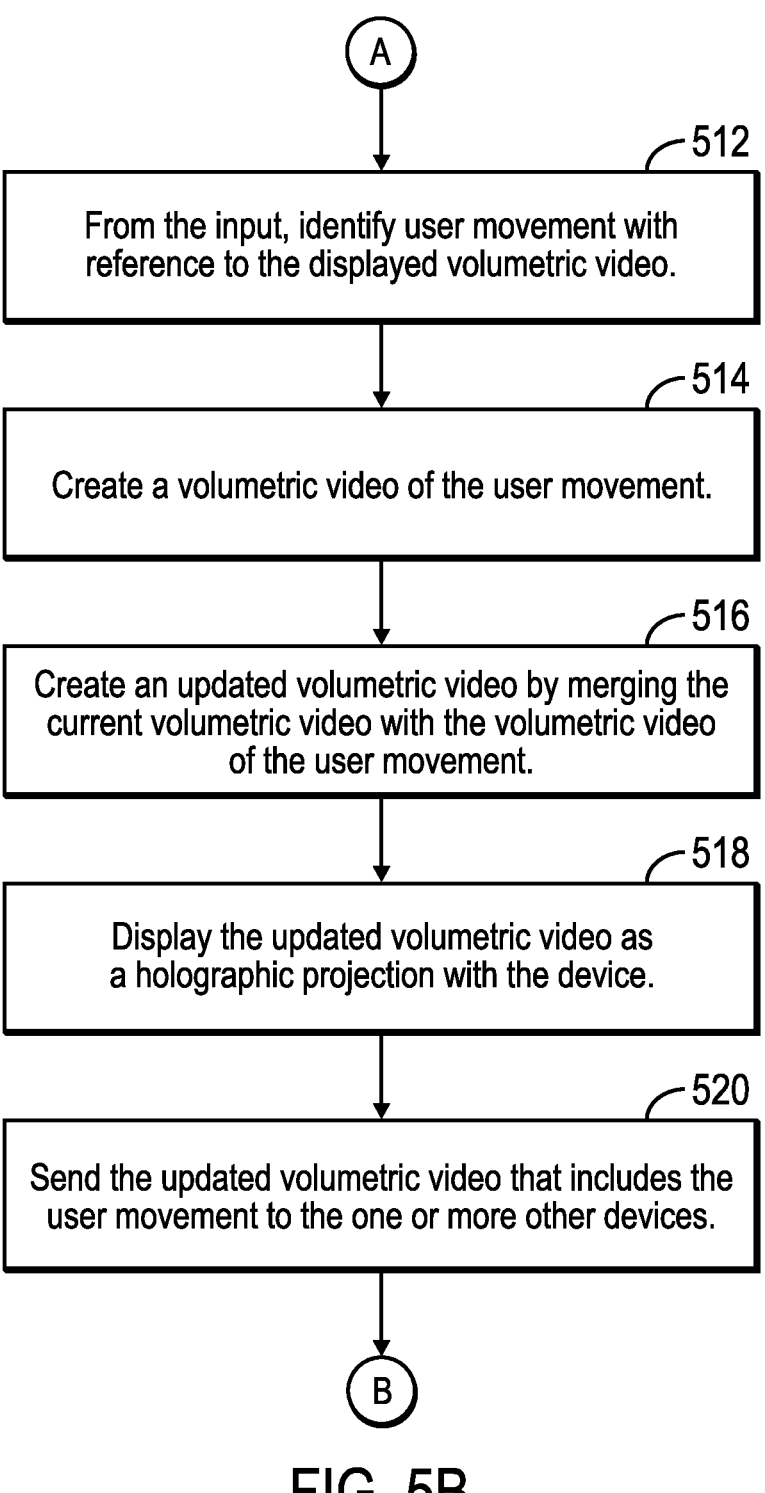
Figure 5C:
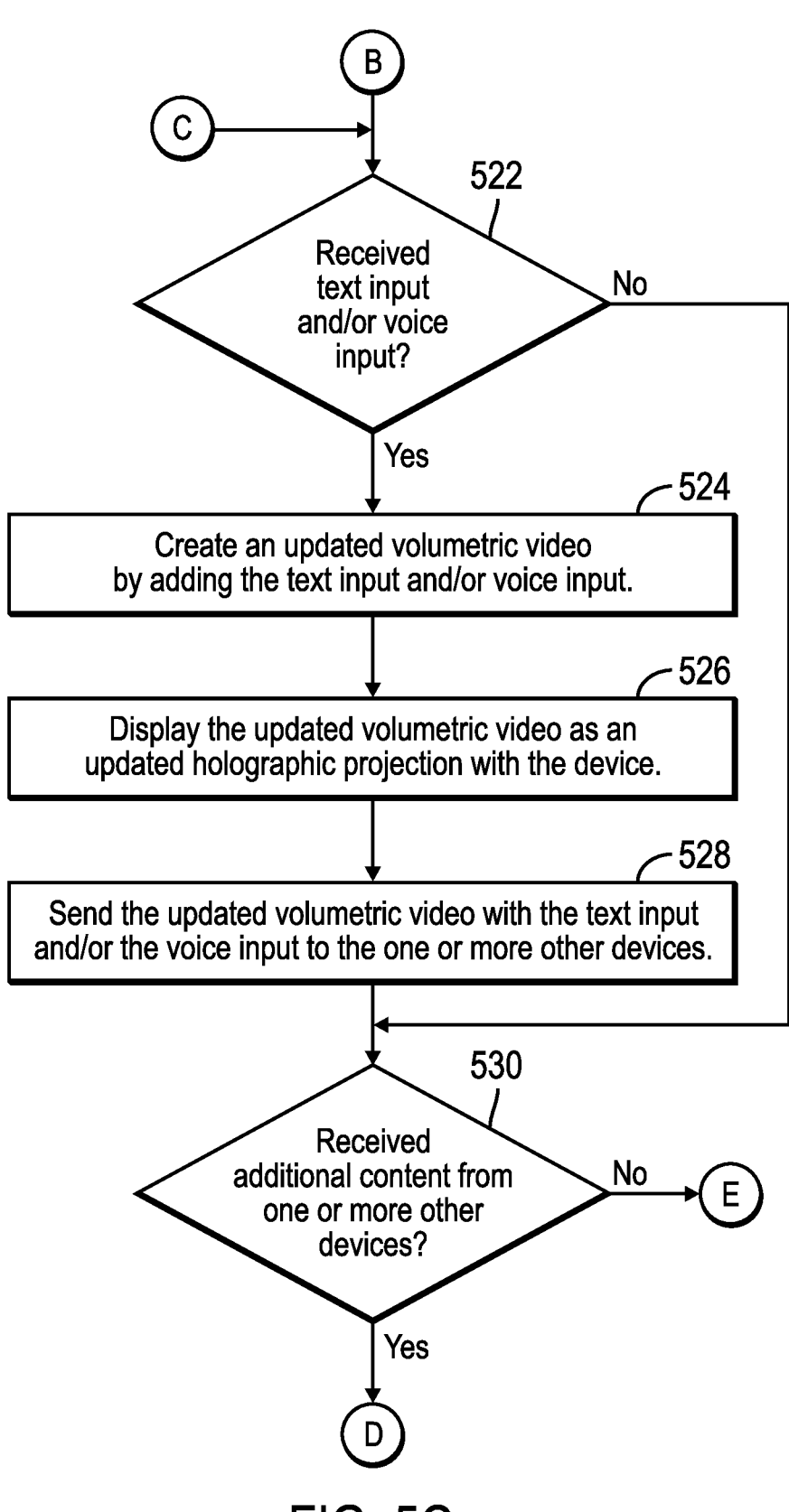

FIGS. 5A, 5B, and 5C illustrate, in a flowchart, operations for enhancing volumetric video at one computing device that is in collaboration with one or more other computing devices in accordance with certain embodiments. That is, users at the devices are collaborating by sharing a volumetric video and adding additional content (user actions and/or text). Each user's additional content may be said to be incremental to the current volumetric video. In certain embodiments, with the initial collaboration, each collaborating device retrieves a particular volumetric video to be shared or one of the devices selects and sends that volumetric video to each of the other collaborating devices. Then, one or more users at respective devices may add additional content to the shared volumetric video, which is sent to each of the other devices. The particular volumetric video may be referred to as a "first", "initial", "original" or "starting" volumetric video that may be enhanced with additional content.

Control begins at block 500 with the volumetric video system 110, at one device, receiving additional content for a volumetric video from one or more other devices. The additional content may be any combination of: one or more user actions of a user at another device, text input, and voice input.

In block 502, the volumetric video system 110 aggregates (i.e., combines) the additional content from the one or more other devices with the volumetric video to generate an aggregated (i.e., combined) volumetric video. In block 504, the volumetric video system 110 displays the aggregated volumetric video as a holographic projection with the device. In block 506, the volumetric video system 110 provides a recommendation as to how the display screen is to be adjusted (i.e., angled or folded). In block 508, the volumetric video system 110 receives an indication that the display screen has been adjusted per the recommendation.

In block 510, the volumetric video system 110 determines whether input has been received from one or more cameras. If so, processing continues to block 512 (FIG. 5B), otherwise, processing continues to block 520 (FIG. 5C).

In block 512, from the input, the volumetric video system 110 identifies user movement with reference to the displayed volumetric video. In block 514, the volumetric video system 110 creates a volumetric video of the user movement. In block 516, the volumetric video system 110 creates an updated volumetric video by merging the current volumetric video with the volumetric video of the user movement. The current volumetric video is the one currently being worked on. In block 518, the volumetric video system 110 displays the updated volumetric video as an updated holographic projection with the device. The updated holographic projection includes the user movement. In certain embodiments, by merging the displayed volumetric video with the volumetric video of the user movement, the volumetric video system 110 creates an enhanced volumetric video, which the volumetric video system 110 may store in storage 150 and/or external storage 190.

In block 520, the volumetric video system 110 sends the updated volumetric video that includes the user movement to the one or more other devices. From block 520, processing continues to block 522 (FIG. 5C).

In block 522, the volumetric video system 110 determines whether text input and/or voice input was received. If so, processing continues to block 524, otherwise, processing continues to block 528. For example, text input may be typed in or translated from voice input. Also, the voice input may be obtained from a conversation.

In block 524, the volumetric video system 110 creates an updated volumetric video by adding (e.g., incorporating) the text input and/or voice input. In block 526, the volumetric video system 110 displays the updated volumetric video as an updated holographic projection with the device. In this manner, the volumetric video system 110 updates the displayed holographic projection of the volumetric video with the text input and/or voice input. In certain embodiments, the text input is displayed in the holographic projection. In other embodiments, the text input is displayed adjacent to the holographic projection. In certain embodiments, the voice input is incorporated into the holographic projection and automatically played. In other embodiments, the voice input is available to be played adjacent to the holographic projection. This creates an enhanced volumetric video, which the volumetric video system 110 may store in storage 150 and/or external storage 190.

In block 528, the volumetric video system 110 sends the updated volumetric video with the text input and/or the voice input to the one or more other devices.

In block 530, the volumetric video system 110 determines whether additional content from one or more other devices has been received. If so, processing continues to block 502 (FIG. 5A), otherwise, processing continues to block 510 (FIG. 5A). With embodiments, the additional content may be another volumetric video, text input and/or voice input.

Figure 6:
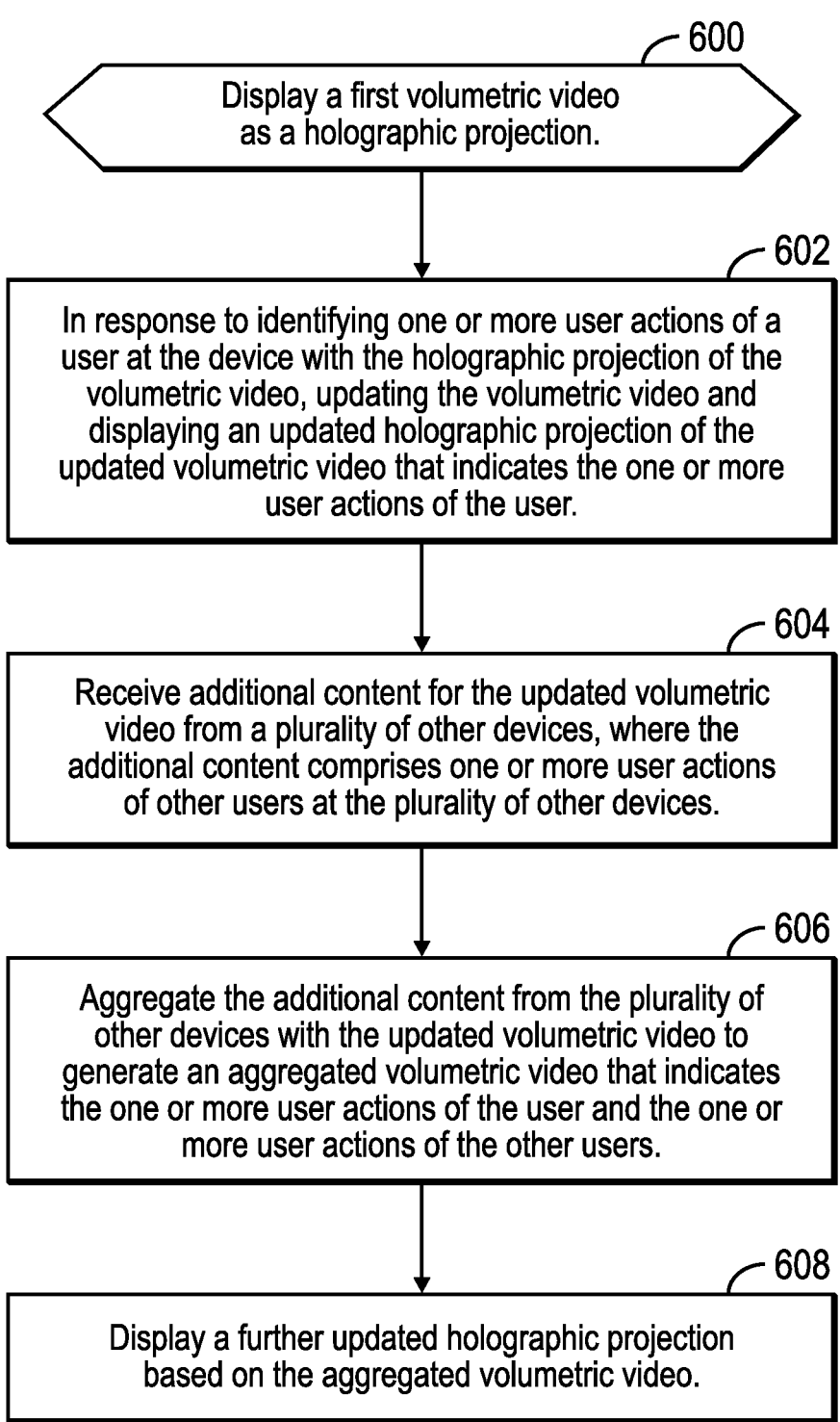
FIG. 6 illustrated, in a flowchart, operations for collaborative enhancement of volumetric video with a device having multiple cameras in accordance with certain embodiments.

FIG. 6 illustrated, in a flowchart, operations for collaborative enhancement of volumetric video with a device having multiple cameras in accordance with certain embodiments. Control begins at block 600 with the volumetric video system 110 displaying a volumetric video as a holographic projection. This may be referred to as a "first", "initial", "original" or "starting" volumetric video that may be enhanced with additional content.

In block 602, in response to identifying one or more user actions of a user at the device with the holographic projection of the volumetric video, the volumetric video system 110 updates the volumetric video (to create an updated volumetric video) and displays an updated holographic projection of the updated volumetric video that indicates the one or more user actions of the user. In particular, the volumetric video system 110 identifies one or more user actions with the holographic projection of the first volumetric video with image analysis of input from one or more cameras, creates a second volumetric video of the one or more user actions, updates the first volumetric video with the second volumetric video, and displays an updated holographic projection of the updated first volumetric video.

In block 604, the volumetric video system 110 receives receiving additional content for the updated volumetric video from a plurality of other devices, wherein the additional content comprises one or more user actions of other users at the plurality of other devices.

In block 606, the volumetric video system 110 aggregates the additional content from the plurality of other devices with the updated volumetric video to generate an aggregated volumetric video that indicates the one or more user actions of the user and the one or more user actions of the other users. In particular, the additional content may be other volumetric videos from the plurality of other devices, and the volumetric video system 110 merges the other volumetric videos with the updated volumetric video (of block 602). In various embodiments, the order of merging may be based on different factors, such as a timestamp associated with each of the other volumetric videos, a priority given to users generating the other volumetric videos, etc.

In block 608, the volumetric video system 110 displays a further updated holographic projection based on the aggregated volumetric video.

In certain embodiments, the volumetric video system 110 sends the updated volumetric video to the plurality of other devices. In certain embodiments, the users at the device and at the plurality of other devices work collaboratively on the first volumetric video.

In certain embodiments, the volumetric video system 110 provides a recommendation of a folding angle for a display screen of the device. In certain embodiments, the volumetric video system 110 captures the one or more user actions of the user at the device from different directions using multiple cameras.

In certain embodiments, the volumetric video system 110 receives text input, updates the aggregated volumetric video with the text input, and displays a further updated holographic projection of the updated aggregated volumetric video with the text input.

In certain embodiments, the volumetric video system 110 receives voice input, updates the aggregated volumetric video with the voice input, and displays a further updated holographic projection of the updated aggregated volumetric video with the voice input.

With embodiments, the volumetric video system 110 captures user actions with a device's existing cameras, where the cameras are in different locations and provide different directional viewpoints.

With embodiments, once the volumetric video is enhanced, then the volumetric video system 110 may share (send) the enhanced volumetric video in social networks and via different communication channels to a receiving party, who may view or add content to that enhanced volumetric video. With embodiments, the receiving party may update the received volumetric video by interacting with the volumetric video content.

With embodiments, the device 100 and/or display screen includes holographic projection modules, and the volumetric video system 110 uses the holographic projection modules to project the volumetric video as a holographic projection.

With embodiments, the device includes a volumetric video processing module, and the volumetric video system 110 uses the volumetric video processing module to analyze multidirectional image feeds and to create an updated volumetric video.

With embodiments, the volumetric video system 110 identifies when the user is interacting with the volumetric video as a holographic projection. In certain embodiments, the volumetric video system 110 performs this identification with image analysis.

With embodiments, once the cameras are positioned with reference to a folding angle recommended by the volumetric video system 110, the volumetric video system 110 creates a holographic projection of a volumetric video, and then the user is able to interact with the volumetric video via the holographic projection.

With embodiments, the volumetric video system 110 uses camera feeds from the cameras installed in the display screen to track the hand movement and to identify what actions the user is performing. With embodiments, multiple cameras from different directions capture the user's hand interactions on the holographic projection of the volumetric video.

With embodiments, the volumetric video system 110 processes the holographic content of the volumetric video and the user actions from various directions.

With embodiments, updated volumetric video may be shared via one or more communication channels with one or more other users.

With embodiments, the volumetric video system 110 recommends the folding angle of the device so that user actions on the volumetric video may be captured from multiple directions.

With embodiments, the volumetric video system 110 identifies multiple users who want to collaborate with each other to create an enhanced volumetric video with input from different users. Then, the participating users are able to visualize each other's actions. In certain embodiments, a cloud hosted system may be used to allow sharing of the volumetric video and to show the user actions in the holographic interface.

With embodiments, for a collaborative enhancement of volumetric video with devices having multiple cameras, after interaction on any volumetric video in any communication channel, the user interacting with the volumetric video may perform hand movement-based action on the volumetric video, and the volumetric video system 110 uses a plurality of front cameras of the display screen to track the user's action on the volumetric video and updates the volumetric video with additional content.

With embodiments, the volumetric video system 110 of the device 100 (e.g., laptop, foldable mobile, etc.) projects the volumetric video as a holographic projection and cameras installed in different portions of the display screen track the user's actions on the holographic projection of the volumetric video to identify what actions are being performed by the user. Then, the volumetric video system 110 updates the volumetric video with additional content.

With embodiments, if the user interacting with the volumetric video wants to update the projected volumetric video on the foldable display screen, then the volumetric video system 110 recommends how the display screen is to be folded so that multiple cameras of the display screen may capture the user's action from various directions. Then, the volumetric video system 110 uses the captured user's action to update the volumetric video.

With embodiments, the volumetric video system 110 updates the volumetric video in a collaborative manner, with multiple users receiving the volumetric video and updating the volumetric video in a collaborative manner, such that each user views each other user's action in the holographic projection.

With embodiments, once the cameras of the display screens of the collaborating users capture the user actions on the volumetric video, then the volumetric video system 110 performs image analysis to identify each action that has been performed by the collaborating users on different devices and aggregates the received volumetric video content to create an aggregated volumetric video.

With embodiments, the volumetric video system 110 may receive text input and/or voice input in the communication channel, and the volumetric video system 110 updates the volumetric video in a collaborative manner. Thus, along with image analysis to identify the user actions performed, the volumetric video system 110 also analyzes text (e.g., input by typing or by speaking (such as through a conversation)) and updates the volumetric video.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 7 illustrates a computing environment 700 in accordance with certain embodiments. Computing environment 700 contains an example of an environment for the execution of at least some of the computer code involved in performing the inventive methods, such as the volumetric video system 710 for collaborative enhancement of volumetric video with a device having multiple cameras. In addition to block 710, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 710, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 710 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 710 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments.

Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

ADDITIONAL EMBODIMENT DETAILS

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A method implemented in a device, comprising operations for:

displaying a volumetric video as a holographic projection;

in response to identifying one or more user actions of a user at the device with the holographic projection of the volumetric video, updating the volumetric video; and displaying an updated holographic projection of the updated volumetric video that indicates the one or more user actions of the user;

receiving additional content for the updated volumetric video from a plurality of other devices, wherein the additional content comprises one or more user actions of other users at the plurality of other devices;

aggregating the additional content from the plurality of other devices with the updated volumetric video to generate an aggregated volumetric video that indicates the one or more user actions of the user and the one or more user actions of the other users; and displaying a further updated holographic projection based on the aggregated volumetric video.

2. The method implemented in the device of claim 1, further comprising operations for:

sending the updated volumetric video to the plurality of other devices.

3. The method implemented in the device of claim 1, further comprising operations for:

providing a recommendation of a folding angle for a display screen of the device.

4. The method implemented in the device of claim 1, further comprising operations for:

capturing the one or more user actions from different directions using multiple cameras.

5. The method implemented in the device of claim 1, further comprising operations for:

receiving text input;

updating the aggregated volumetric video with the text input; and displaying a yet further updated holographic projection of the updated aggregated volumetric video with the text input.

6. The method implemented in the device of claim 1, further comprising operations for:

receiving voice input;

updating the aggregated volumetric video with the voice input; and displaying a yet further updated holographic projection of the updated aggregated volumetric video with the voice input.

7. The method implemented in the device of claim 1, wherein users at the device and at the plurality of other devices work collaboratively on the volumetric video.

8. A computer program product, the computer program product comprising a computer readable storage medium having program code embodied therewith, the program code executable by at least one processor of a device to perform operations for:

displaying a volumetric video as a holographic projection;

in response to identifying one or more user actions of a user at the device with the holographic projection of the volumetric video, updating the volumetric video; and displaying an updated holographic projection of the updated volumetric video that indicates the one or more user actions of the user;

receiving additional content for the updated volumetric video from a plurality of other devices, wherein the additional content comprises one or more user actions of other users at the plurality of other devices;

aggregating the additional content from the plurality of other devices with the updated volumetric video to generate an aggregated volumetric video that indicates the one or more user actions of the user and the one or more user actions of the other users; and displaying a further updated holographic projection based on the aggregated volumetric video.

9. The computer program product of claim 8, wherein the program code is executable by the at least one processor to perform further operations for:

sending the updated volumetric video to the plurality of other devices.

10. The computer program product of claim 8, wherein the program code is executable by the at least one processor to perform further operations for:

providing a recommendation of a folding angle for a display screen of the device.

11. The computer program product of claim 8, wherein the program code is executable by the at least one processor to perform further operations for:

capturing the one or more user actions from different directions using multiple cameras.

12. The computer program product of claim 8, wherein the program code is executable by the at least one processor to perform further operations for:

receiving text input;

updating the aggregated volumetric video with the text input; and displaying a yet further updated holographic projection of the updated aggregated volumetric video with the text input.

13. The computer program product of claim 8, wherein the program code is executable by the at least one processor to perform further operations for:

receiving voice input;

updating the aggregated volumetric video with the voice input; and displaying a yet further updated holographic projection of the updated aggregated volumetric video with the voice input.

14. The computer program product of claim 8, wherein users at the device and at the plurality of other devices work collaboratively on the volumetric video.

15. A device, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

displaying a volumetric video as a holographic projection;

in response to identifying one or more user actions of a user at the device with the holographic projection of the volumetric video, updating the volumetric video; and displaying an updated holographic projection of the updated volumetric video that indicates the one or more user actions of the user;

receiving additional content for the updated volumetric video from a plurality of other devices, wherein the additional content comprises one or more user actions of other users at the plurality of other devices;

aggregating the additional content from the plurality of other devices with the updated volumetric video to generate an aggregated volumetric video that indicates the one or more user actions of the user and the one or more user actions of the other users; and displaying a further updated holographic projection based on the aggregated volumetric video.

16. The device of claim 15, wherein the operations further comprise:

sending the updated volumetric video to the plurality of other devices.

17. The device of claim 15, wherein the operations further comprise:

providing a recommendation of a folding angle for a display screen of the device.

18. The device of claim 15, wherein the operations further comprise:

capturing the one or more user actions from different directions using multiple cameras.

19. The device of claim 15, wherein the operations further comprise:

receiving text input;

updating the aggregated volumetric video with the text input; and displaying a yet further updated holographic projection of the updated aggregated volumetric video with the text input.

20. The device of claim 15, wherein the operations further comprise:

receiving voice input;

updating the aggregated volumetric video with the voice input; and displaying a yet further updated holographic projection of the updated aggregated volumetric video with the voice input.

\* \* \* \* \*